United States Patent [19]
McPhee et al.

[11] Patent Number: 6,109,358
[45] Date of Patent: Aug. 29, 2000

[54] VENTING APPARATUS AND METHOD FOR REMEDIATION OF A POROUS MEDIUM

[75] Inventors: Wayne McPhee, Etobicoke; Stuart Eddy, Mississauga, both of Canada

[73] Assignee: Conor Pacific Environmental Technologies Inc., Burlington, Canada

[21] Appl. No.: 09/244,888

[22] Filed: Feb. 5, 1999

[51] Int. Cl.⁷ ................................................ E21B 43/18
[52] U.S. Cl. ........................ 166/401; 166/370; 405/258
[58] Field of Search .................................. 166/401, 267, 166/370, 90.1, 369, 76.1; 405/258, 128

[56] References Cited

U.S. PATENT DOCUMENTS

| | | | |
|---|---|---|---|
| 4,385,871 | 5/1983 | Beisel . | |
| 4,401,569 | 8/1983 | Jhaveri et al. . | |
| 4,593,760 | 6/1986 | Visser et al. . | |
| 5,221,159 | 6/1993 | Billings et al. | 405/128 |
| 5,358,357 | 10/1994 | Mancini et al. | 405/128 |
| 5,389,267 | 2/1995 | Gorelick et al. | 210/758 |
| 5,407,019 | 4/1995 | Lazarus et al. . | |
| 5,515,932 | 5/1996 | Lazarus et al. . | |
| 5,674,324 | 10/1997 | Ignasiak . | |
| 5,829,918 | 11/1998 | Chintis | 405/128 |
| 5,874,001 | 2/1999 | Carter . | |
| 6,048,134 | 4/2000 | Mancini et al. | 405/128 |

FOREIGN PATENT DOCUMENTS

| | | |
|---|---|---|
| 2117233 | 9/1994 | Canada . |
| 2145031 | 9/1995 | Canada . |
| 0 620 055 | 10/1994 | European Pat. Off. . |

OTHER PUBLICATIONS

Brown, R. et al., "Air Sparging: A New Model for Remediation", Pollution Engineering, Jul., 1992, Groundwater Technology, Norwood, MA, U.S.A.

Alberta Farm Machinery Research Centre, "Summary of Wind and Solar Powered Pumping Units (1993–1996 Test Season)", Summary Report 737, pp. 1–31, Sep. 1998, Canada.

Hinchee, R.E., "Air Sparging State of the Art", pp. 1–13, 1–56670–084–1/94/$0.00 +$.50©, 1994, Lewis Publishers.

Bass, D. H. et al., "Air Sparging Case Study Database Update", 12 pages, undated, publisher unknown.

Angell, K.G. et al.; "In Situ Remedial Methods: Air Sparging", Groundwater Technology, reprinted from The National Environmental Journal, Jan./Feb. 1992, 2(1):20–23, © 1992 by Campbell Publishing, Inc.

Sandia National Laboratories, "Containing Wastes and Costs", Environmental Restoration Technologies, 2 pages, Albuquerque, New Mexico, U.S.A.

U.S. Department of Energy, "The Baro–Ball™ Control Valve", Technology Brief, Westinghouse Savannah River Company, 1 page, Aiken, SC, U.S.A.

Koenders Windmills Inc., "Koenders Windmills", product information brochure, Englefeld, Saskatchewan, Canada, undated.

United States Environmental Protection Agency, "A Citizen's Guide to Soil Vapor Extraction and Air Sparging", Technology Innovation Office, Technology Fact Sheet, Solid Waste and Emergency Response (510G), EPA 542–F–96–008, April 1996.

*Primary Examiner*—Frank Tsay
*Attorney, Agent, or Firm*—Brian W. Gray; Ken Bousfield

[57] ABSTRACT

This invention relates to generally an apparatus and method for accumulating and discharging a gas under pressure or vacuum to aid the remediation of a contaminated porous medium, such as soil or both. In one aspect, a windmill, an air pump, and a linkage between the windmill and the pump to permit the windmill to drive the pump at a higher differential pressure than the dynamic pressure of the wind. A venting head connected in fluid communication with the pump for placement to interact with a porous medium to be vented at a level above the water table.

25 Claims, 6 Drawing Sheets

VENTING APPARATUS AND METHOD FOR REMEDIATION OF A POROUS MEDIUM

FIELD OF INVENTION

This invention relates generally to an apparatus and method for accumulating and discharging a gas under pressure or vacuum to aid in the remediation of a contaminated porous medium, such as soil, or groundwater, or both.

BACKGROUND OF THE INVENTION

Soil and groundwater contamination in remote areas is a common occurrence. For instance, contamination can result from leaks in oil and gas pipelines, fuel leaks along railway lines and at maintenance yards and at remote communities and farms. Contaminants may collect in soil either above or below the local water table. In low lying ground, the water table may be near or at the surface of the soil, as in a bog or marsh, and may collect in pondwater, or below the surface of the water in a mud, sand or other type of bottom.

Contaminants of soil and groundwater may include volatile organic compounds, such as for example, trichloroethane, trichloroethylene, benzene, toluene, ethylbenzene, and xylene, hydrocarbon products, such as for example, diesel fuel and kerosene, other petroleum products, such as for example, gasoline, heating oil and lubricating oils and metals, such as for example, iron, manganese and copper.

A number of remediation technologies can be used to combat soil and groundwater contamination. Soil vapour extraction is a process that physically separates contaminants from the soil in vapour form. Soil vapour extraction systems target contaminants that have a tendency to volatilize or evaporate easily, such as volatile organic compounds. This process is known as volatilization. By applying a vacuum through the subsurface, at a level above the local water table, contaminants are drawn to the surface as vapour or gas and are subsequently treated using carbon adsorption, biofiltration, incineration, condensation or catalytic oxidation. Such a treatment technique requires the installation of vapour extraction wells and air injection wells or air vents in the contaminated area.

Air injection wells use air compressors to force air into the ground. Air vents serve the same function but merely provide a passage for air to be drawn into the ground rather than requiring the active pumping of air into the site. As will be discussed below, used alone, soil vapour extraction tends not to be suitable for removing contaminants in the saturated zone of the subsurface, the soil that lies below the water table. In such situations, the process of air sparging may be used in combination with the soil vapour extraction system.

Dual phase extraction is a process that is similar to soil vapour extraction but the extraction wells are sunk further into the ground to a level below the water table and therefore into the saturated zone. A strong vacuum is applied through the extraction wells to remove vapours. A pump is used to remove liquid that collects in the bottom of the extraction well, or wells. Both the extracted gases and liquids can be treated and discharged.

Air sparging and venting are remediation technologies that are used to treat contaminants, such as dissolved volatile organic compounds, in groundwater and soil. Both venting and air sparging involve the injection of air under pressure into soil and groundwater respectively. Specifically, air sparging refers to the injection of air or other gas under pressure at a level below the height of the local water table into the saturated zone. The injected air displaces water and creates air-filled porosity or channels in the saturated soil. Venting refers to the injection of air or gas into the subsoil at a level above the height of the local water table, that is, into the unsaturated zone. To work, air sparging and venting rely on two basic mechanisms, biodegradation and volatilization. Biodegradation is typically stimulated by the introduction of oxygen in air into the site to enable naturally occurring microorganisms to biologically degrade organic compounds into harmless substances. Volatilization occurs when the contaminant, or a portion of the contaminant, is encouraged to evaporate, typically by the provision of a gas in which the contaminant vapour can be carried away.

Air sparging can also be used to change the electrochemical potential of the groundwater from a reducing potential to an oxidizing potential. Groundwater is frequently found to be under reducing conditions which can cause increased concentrations of some metals including, but not limited to, iron, manganese, arsenic, selenium and copper. By introducing oxygen or air into the groundwater, the electrochemical potential will tend to be changed from reducing to oxidizing and the metal ions will be oxidized to less soluble forms. For example, soluble $Fe^{2+}$ will tend to oxidize to $Fe^{3+}$ which will tend to precipitate out as iron hydroxide.

Engineered biocells or biopiles can also be used for soil remediation. This technology involves excavating contaminated soil and forming it into piles. Slotted or perforated piping is placed to extend through the piles. Biopiles use oxygen, usually from air, to stimulate the growth of aerobic bacteria which degrade certain contaminants, such as petroleum products adsorbed to soil. Biopiles are aerated by forcing air to move by injection or extraction through the perforated piping placed throughout the piles. As with the other remediation systems discussed, biopiles remove soil contaminants through the processes of evaporation and biodegradation.

The effectiveness of many of the remediation techniques described above can be increased through the use of pulse systems. Injection of pulses of gas into the ground and groundwater provides for better mixing and increases the density of uniformly distributed air channels. Typically, pulse systems are set up using an electrical timer or a programmable logic controller, or both, either to turn an air blower on and off as required, or to operate control valves for directing pressurized air to several different wells in a programmed sequence. The pulsing system will turn the air flow to a well 'On' for the length of time required to have the soil and groundwater reach an equilibrium condition, where the oxygen levels have reached a maximum concentration or the concentration of volatile organic compounds reaches a steady state. Typically, the 'On' cycle will last from 30 minutes to eight hours depending on the contaminant, subsurface conditions, air flow rate and air pressures. The pulsing system will turn the air flow 'Off' when equilibrium conditions have been reached because additional flow is of limited value and the system will redirect the flow to another well or shut-off the blower to save energy. The 'Off' cycle will last until the oxygen levels have dropped too low or volatile contaminant concentrations have increased. Typically the 'Off' cycle will last from 30 minutes to several days.

Gasoline and diesel engines, and electrical motors can be used to drive air pumps, blowers, compressors or similar equipment to inject air directly into contaminated soils and groundwater, whether in a sparging process or in a venting process. As well, compressed gas such as compressed air or liquid oxygen can be used to provide pressurized air or oxygen to a subsurface well. The compressed air or liquid oxygen is then released through vents in the well and travels into the soil and groundwater. Similarly, depending on the remediation process chosen, vacuums can be used to vaporize and extract contaminants from the site. Both fossil fuel driven generators and electrical line power brought in from a utility offer immediate, on demand response to system requests for power either to provide compressed air or to operate vacuum extraction equipment.

These current soil and groundwater contamination systems have a number of disadvantages. Among the disadvantages of electric motors is the need to bring in electricity from a significant distance. This may not be practical at remote locations where power is not available from a local electric utility, or is only available at unreasonable expense. In those instances it would be advantageous not to have to draw power from an electrical grid.

One alternative to this is to use a fossil fuel driven system, such as a diesel or gasoline engine, either to drive a generator to provide power for an electric motor, or directly to drive a compressor or similar machine. However, such equipment requires refuelling relatively often, and may require relatively frequent visits by an operator or maintenance technician. The equipment itself may contribute to the kind of soil remediation problem that sparging and bioventing are intended to alleviate. That is, in some remote locations, soil contamination problems have arisen due to the abandonment of fuel and lubricant materials originally used to operate engines for generating electrical power. It would be advantageous to have a soil remediation system that requires relatively little outside intervention, whether in terms of the need for refuelling, the need for maintenance, or the need to clean up after the remediation process itself is finished. It would be advantageous to dispense with the need for a fossil fuel engine.

The terms "passive energy conversion system" and "passive gas recharging system" are used to refer to a system that does not provide power on demand. That is, passive systems rely on casual energy capture, and do not provide predictable, on demand power in the manner of a gasoline powered generator or an electrical motor drawing power from the power grid of an electrical utility. A passive energy conversion system is amenable for use with remediation systems, such as air sparging, because such remediation systems do not have inflexible time frame demands. In other words, the effectiveness of a remediation system is not dependent on a fixed duty cycle. On the contrary, soil remediation projects are frequently highly time insensitive. Remediation may occur over a period of months or years. Taken over the longer time period, the energy requirement of remote soil remediation systems may fall within the range of that which is available on a passive basis either from wind power, solar power, or some other passive energy source. While these passive energy sources may be relatively unpredictable on an instantaneous demand basis, their overall, average power availability is suitable to a process, such as soil remediation, that may have a relatively forgiving time scale. Passive energy conversion systems such as wind, solar, wave, geothermal and hydraulic energy conversion systems are amenable for use in remote areas where electrical power may not be readily available from an electrical utility.

On an instantaneous demand basis, a passive energy conversion system such as a windmill, for example, taken alone, may only be able to produce low flow rates and short pulses. A windmill, or solar collector, may be unable to produce adequate pressure and pulse rate to permit effective air sparging and venting of the contaminated site on an on demand basis. However, when coupled with a pulse or charge storage device, it may be possible to achieve satisfactory soil and groundwater remediation results.

With a view to overcoming these problems it would be advantageous to provide an apparatus and method to effect soil and groundwater remediation by accumulating a gas to a sufficient pressure using a passive energy conversion system such as a windmill, for example, and a pressure tank, and discharging a pulse of pressurized gas into contaminated soil and groundwater. Alternatively, it would be advantageous to operate a vacuum extraction system using a passive system.

SUMMARY OF THE INVENTION

In an aspect of the invention there is a bioventing apparatus. It has a windmill, an air pump, and a linkage between the windmill and the pump to permit the windmill to drive the pump at a higher differential pressure than the dynamic pressure of the wind. It has a venting head connected in fluid communication with the pump, the venting head being for placement to interact with a porous medium to be vented at a level above the water table.

In an additional feature of that aspect of the invention, the venting head is a vacuum extraction head and the pump is operable to draw gases into the venting head. In another additional feature of that aspect of the invention, the pump is connected to force air to exit from the venting head. In a further additional feature of that aspect of the invention, the pump is a positive displacement pump. In yet a further additional feature of that aspect of the invention, the pump is a reciprocating pump.

In another aspect of the invention there is an apparatus for accumulating and discharging a gas. It has a reservoir for accumulating a charge of gas and porting to enable the gas to enter and exit the reservoir, a discharge governor that controls the discharge of gas from the reservoir, a passive gas recharging system and a discharge head connected to receive gas, such as air, from the reservoir and to discharge into a porous medium. The discharge head may be placed in such a manner as to permit the release of gas externally into a porous medium such as soil or groundwater, for example. The discharge head can be a vented head such as a sparge well for example that can be placed in the ground at a level below the height of the local water table in the case of sparging or at a level above the height of the local water table in the case of venting. In a further additional feature of that aspect of the invention, the discharge head, in the form of vented pipe, can be located in the midst of a pile of biomass.

In an additional feature of that aspect of the invention, the discharge governor is operable to release pulses of gas from the reservoir.

In a further additional feature of that aspect of the invention the apparatus comprises a pump, such as for example, a positive displacement pump for filling the reservoir with gas, the pump being driven by a passive gas recharging system. A number of different passive gas recharging systems may be used to drive the pump and thereby charge the reservoir, including wind, solar, wave, geothermal and hydraulic energy conversion systems. For example, the pump can be driven by a windmill thereby recharging the reservoir with ambient air.

In a yet further additional feature of the invention the apparatus includes an additional tank or tanks that may contain chemical additives, nutrients or microbes for injection into the porous medium along with the gas.

In still another aspect of the invention there is an apparatus for establishing and relieving a partial vacuum. It has a reservoir in which to establish the partial vacuum, porting to permit gas to exit and enter the reservoir, an inlet head connected to the reservoir with the inlet head being located to draw gas from a porous medium, an inlet governor mounted to control the entry of gas into the reservoir and a passive gas recharging system connected to the reservoir to permit re-establishment of the partial vacuum. In an additional feature of that aspect of the invention the governor is operable to release pulses of gas into the reservoir.

In another additional feature of that aspect of the invention the apparatus further comprises a passive gas recharging system that includes a pump, such as, for example, a positive displacement pump for drawing down the pressure in the reservoir which in turn may be driven by solar, hydraulic, wind, geothermal or wave energy. For example, the pump can be driven by a windmill.

In another aspect of the invention, the apparatus for establishing and relieving a partial vacuum may be used in combination with liquid phase extraction elements such as for instance, a windmill and a windmill driven pump to extract groundwater and expose more contaminated soil to the vacuum apparatus.

In another aspect of the invention, there is a method of discharging gas such as air into a porous medium by accumulating a quantity of gas in a reservoir, discharging at least some of the gas from the reservoir, directing the discharge of gas into the porous medium and using a passive recharging system to recharge the reservoir. In an additional feature of that aspect of the invention, the method further includes the steps of monitoring the gas in the reservoir, permitting the discharging of the gas to occur once a set pressure of gas has been observed in the reservoir, allowing the pressure in the reservoir to fall during the step of discharging to a lower value than the set pressure and impeding further discharge from the reservoir once the pressure has fallen to the lower value.

In still a further additional feature of that aspect of the invention, the step of using a passive recharging system includes using a pump to urge gas such as air into the reservoir and using a windmill to drive the pump. In a yet further additional feature of that aspect of the invention, the step of permitting a discharge includes releasing pulses of gas from the reservoir.

In a yet further additional feature of that aspect of the invention, the step of directing the gas into a porous medium includes into the ground at a level below the height of the local water table in the case of sparging, at a level above the height of the local water table in the case of venting or into a pile of biomass.

In still a further additional feature of that aspect of the invention, the method is a method for treatment of contaminants in a porous medium such as soil, groundwater or in a biopile, where such contaminants may be biodegradable organic compounds, metals or volatile organic compounds through the processes of volatilization, biodegradation or precipitation of chemicals by oxidation.

In another aspect of the invention, there is a method of drawing a gas from a porous medium by developing a partial vacuum in a reservoir, establishing fluid communication between the reservoir and a well head located in the porous medium, drawing gas from the porous medium to at least partially relieve the vacuum and re-establishing the partial vacuum in the reservoir using a passive recharging system. This method further includes the steps of monitoring the vacuum in the reservoir, permitting the step of drawing to occur once a set level of vacuum has been observed in the reservoir, allowing the pressure in the reservoir to rise to a higher value, and impeding further increase in pressure in the reservoir once the pressure has risen to the higher value.

In a further additional feature of that aspect of the invention, the step of using a passive gas recharging system includes using a pump to establish the partial vacuum in the reservoir, and using a windmill to drive the pump. The gas, for example, a volatile organic compound, can be drawn from a level above the height of the local water table or from a pile of biomass. The gas drawn from the porous medium can be treated in the reservoir or a filtration bed.

In a further aspect of this invention there is an apparatus for soil and groundwater remediation which includes a passive gas recharging system for generating intermittent gas pressure using natural forces, a reservoir connected to the passive gas recharging system for accumulating a charge of gas under pressure as generated, a governor mounted to control the exit of gas from the reservoir and operable to open when the pressure of the gas accumulated in the reservoir is at a preset high value and to close when the pressure of the gas accumulated in the reservoir falls below a preset lower value and a discharge means connected to the governor to direct gas so released under pressure into soil, groundwater or into a biopile.

In still a further feature of that aspect of the invention the passive gas recharging system is a windmill and a pump driven by a windmill and the natural force is wind.

In a yet further additional feature of the invention there is an apparatus for soil and groundwater remediation comprising a windmill, a pump driven by the windmill, a reservoir connected to the pump for drawing gas from the reservoir to establish a partial vacuum, an inlet governor on the reservoir which blocks the entry of gas into the reservoir until the partial vacuum reaches a preset minimum pressure which opens and then permits the entry of gas into the reservoir until the partial vacuum rises to a preset maximum pressure, at which time it closes, and an extraction well in the ground having a channel connected to the inlet governor for extracting gas from the ground when the inlet governor permits entry of gas into the reservoir.

In yet a further additional feature of that aspect of the invention, there is an apparatus for soil and groundwater remediation comprising at least one windmill, an air pump driven by at least one windmill, a reservoir connected to the air pump for drawing gas from the reservoir to establish a partial vacuum, an inlet governor on the reservoir which blocks the entry of gas into the reservoir until the partial vacuum reaches a preset minimum pressure which opens and then permits the entry of gas into the reservoir until the partial vacuum rises to a preset maximum pressure, and closes at the maximum pressure, an extraction well in the ground with the inlet governor being connected to the extraction well to permit gas to be extracted from the well and a liquid pump driven by at least one windmill with the liquid pump being connected to the well for drawing liquid therefrom. In a still further feature of that aspect of the invention a single windmill is connected to drive both the air pump and the liquid pump and to drive one of the air pump and the liquid pump and then to drive the other. In a still further feature of that aspect of the invention one windmill is connected to drive the air pump and another windmill is connected to drive the liquid pump.

In a yet further additional feature of the invention there is an apparatus for accumulating and discharging a gas that includes a reservoir for accumulating a charge of gas, porting to permit gas to enter and exit the reservoir, a discharge governor mounted to control the exit of gas from the reservoir, a passive gas recharging system connected to the reservoir to permit recharging of the reservoir and a submersible discharge head connected to receive gas from the reservoir where the discharge head is capable of operating in a liquid medium.

BRIEF DESCRIPTION OF THE DRAWINGS

The principles of the invention are explained below with the aid of the following illustrative Figures.

DETAILED DESCRIPTION OF THE INVENTION

The description which follows, and the embodiments described therein, are provided by way of illustration of an example, or examples of particular embodiments of the principles of the present invention. These examples are provided for the purposes of explanation, and not of limitation, of those principles and of the invention. In the description which follows, like parts are marked throughout the specification and the drawings with the same respective reference numerals. The drawings are not necessarily to scale and in some instances proportions may have been exaggerated in order to more clearly depict certain features of the invention.

Figure 1:
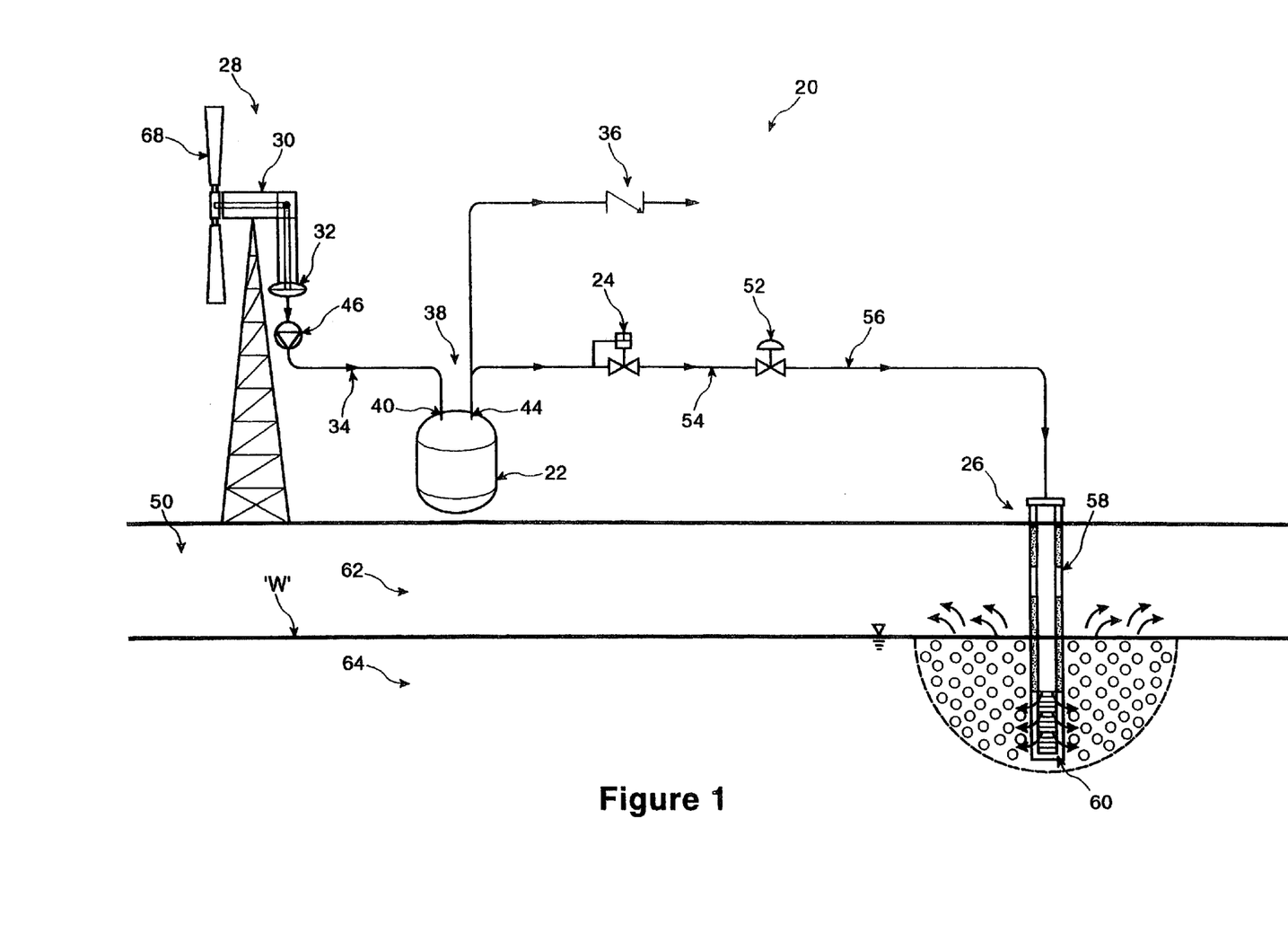
FIG. 1 shows an example of a sparging system according to the present invention.

FIG. 1 shows a schematic of an example of an apparatus for delivering, accumulating and discharging gas according to the principles of the present invention indicated generally as 20. The apparatus has a reservoir 22 in the nature of a pressure vessel, or tank, for accumulating a charge of gas such as, for example in the preferred embodiment, air. A discharge governor in the nature of a pressure sensitive discharge valve 24 controls the discharge of gas from reservoir 22 to a discharge head 26. A passive gas recharging system 28 includes a passive energy conversion device in the nature of a windmill 30 and a pump 32, driven by windmill 30. Pump 32 is connected to reservoir 22 by a connecting line 34, in the nature of a pipe or pressure hose, to permit the recharging of gas.

In the preferred embodiment illustrated schematically in FIG. 1, reservoir 22 has a volume of about 200 liters (50 U.S. gallons). Although the preferred embodiment is made of metal, reservoir 22 could also be made of fibreglass reinforced plastic, and could be larger or smaller as may be found suitable for the sparging process. In the preferred embodiment reservoir 22 is able to withstand greater than 30 p.s.i.g. of pressure. In the event that pipe blockage or high winds result in the reservoir 22 recharging at a rate which exceeds the rate at which the gas in the reservoir flows to the discharge head 26 and out into the surrounding environment, an auxiliary pressure relief value 36 moves to an open state to permit the excess pressure to be released regardless of the passive energy conversion system employed. Pressure relief valve 36 is set at some value greater than the trigger value of valve 24, that is, at some value greater than the 30 p.s.i.g. noted above, but less than the rupture pressure of reservoir 22, to vent reservoir 22 to ambient.

Reservoir 22 has porting 38 to permit the gas to enter and to exit. Porting 38 includes an inlet port 40 through which gas enters reservoir 22 from connecting line 34, and an outlet, or discharge port 44 whence gas pipe leaves reservoir 22. A check valve 46 at the outlet of pump 32 prevents reverse flow through connecting line 34.

The discharge governor, discharge valve 24, controls the outflow from reservoir 22 to discharge head 26. Discharge valve 24 operates to open at a high, or trigger pressure, but does not close again until the pressure in reservoir 22 falls below a low, or reset pressure that is significantly lower than the trigger pressure. That is, there is a significant hysteresis band between the two pressures. The high or trigger pressure can range from 15 p.s.i.g. to 30 p.s.i.g. and is at least 5 p.s.i.g. The low or reset pressure can range from 1 p.s.i.g. to 15 p.s.i.g.

In operation, over a period of time passive gas recharging system 28 charges reservoir 22 to a sufficiently high pressure to reach the triggering pressure of discharge valve 24. Then discharge valve 24 will move to its 'On' or open state to permit at least some of the gas in reservoir 22 to flow to discharge head 26 and into a porous medium in the nature of contaminated subsoil 50. After some time the pressure in reservoir 22 will fall to the reset pressure, at which time valve 24 will move to its 'Off' or closed state. Pressure in reservoir 22 will again begin to rise as windmill 30 continues to drive pump 32 in the recharging phase of operation. The discharge process will repeat when passive gas recharging system 28 has once again recharged reservoir 22 to the trigger pressure.

An auxiliary governor, in the nature of a flow control valve 52, is located between discharge valve 24 and discharge head 26. An upstream connecting line 54 permits fluid communication between discharge valve 24 and flow control valve 52. A downstream connecting line 56 similarly connects flow control valve 52 with discharge head 26. Consequently, flow control valve 52 receives flow in upstream connecting line 54 at the pressure prevailing in reservoir 22, less line losses, and operates to maintain a substantially constant flow rate in a downstream connecting line 56. In the preferred embodiment flow control valve 52 is a pressure regulator having a downstream sensing line plumbed into line 56. Valve 52 also has a sensing port (not indicated) for sensing ambient pressure. Variations in the downstream pressure will cause incremental, correcting variation in valve position to attempt to maintain a constant downstream pressure in downstream connecting line 56. When the downstream pressure rises, valve 52 closes slightly to reduce the flow. When the downstream pressure falls the valve opens slightly to increase the flow. Although the preferred embodiment of FIG. 1 employs flow control valve 52, in an alternative embodiment, gas can be discharged from reservoir 22 on an 'On'-'Off' basis, with a decaying flow rate, without the intervention of a flow control valve.

As shown in FIG. 1, discharge head 26 is located to discharge into subsoil 50. In the preferred embodiment illustrated, discharge head 26 is a well 58 having perforations 60. As shown, perforations 60 lie at a level below the height of the local water table, indicated as "W". That portion of the soil lying above the water table is indicated as 62, that portion which lies below is indicated as 64. The gas is allowed to bubble out into the adjacent porous medium, that is, the subsoil.

Pump 32 is a positive displacement pump capable of developing pressures in excess of the trigger pressure of valve 24. That is, in the preferred embodiment it is capable of producing pressures in excess of 30 p.s.i.g. In the preferred embodiment illustrated, the inlet of pump 32 draws in ambient air. Other pumps capable of producing higher pressures could be used, such as may be required to suit a specific application. Further, while a reciprocating, positive displacement pump is preferred, other types of pump could be used, provided they are capable of otherwise meeting system requirements.

Although a number of passive energy conversion systems can be used to recharge reservoir 22, it is preferable to use a wind energy conversion system such as windmill 30 and pump 32. Stand alone windmills of the propeller type, and of the rotating multi-vane and egg beater types are all known and commercially available.

The time required to recharge reservoir 22 will depend on the speed at which the blades 68 of windmill 30 turn, which is directly dependent on ambient wind conditions. The length of time of the discharge cycle may be relatively constant, since it is more strongly dependent on the fixed physical geometry of the outlet, and the chosen trigger pressure, than wind conditions. By contrast, the length of the recharge portion of the operating cycle may vary significantly. Notably, by using a passive power source, the system is neither dependent upon obtaining power from an electric utility, nor is it dependent upon a fossil fuel burning device such as a portable gasoline or diesel generator. It does not require an operator to be present, does not require refuelling, and can operate on a highly variable duty cycle depending on wind conditions. It is therefore suitable for use in relatively remote areas, with relatively infrequent, itinerant overview by an operator or maintenance technician.

A number of alternative types of passive gas recharging systems are possible. These systems include hydraulic, wave, geothermal and solar energy conversion systems. For example, the wind energy conversion system including windmill 30 can be replaced by a solar energy conversion system whether photovoltaic or thermal. Windmill 30 could alternatively be replaced by a water wheel or a water turbine in those areas where a sustainable flow of water is available. A wave activated pump placed by the seashore could be used to transform kinetic energy from the waves into mechanical energy and drive pump 32. As with the preferred embodiment, the time to recharge reservoir 22 will depend on the heat generated by the solar energy conversion system, the speed at which the water wheel or water turbine is turning or the speed at which the wave activated pump is pumping. Each of these is dependent on ambient environmental conditions.

In an alternative embodiment, discharge governor 24 can be an electrically activated control valve where the pressure in reservoir 22 is monitored by a small solar powered control panel, with a rechargeable battery, rather than by a mechanical linkage. A solar powered, electrically operated valve of this type, with a small battery, can also operate a timer, if it is desired to operate valve 24 on a timer rather than on a pressure trigger.

In a further alternative embodiment, rather than having discharge valve 24 operate on the basis of a charge of pressure in reservoir 22, a weight sensor could be used to monitor the weight of the reservoir. A weight sensor is useful where pump 32 for filling reservoir 22 is capable of compressing the gas to mixed liquid and gas phases.

In the preferred method, contaminated soil and groundwater, which may typically contain volatile and semi-volatile organic compounds such as oil, gasoline, diesel fuel, chlorinated solvents, related contaminants and metals such as iron, undergo remediation through air sparging or venting. In a preferred, but not limiting example of a method, windmill driven pump 32 directs air through connecting line 34 into reservoir 22 via inlet port 40. Air is accumulated in reservoir 22 until the trigger pressure is reached. Once the trigger pressure is reached, discharge valve 24 opens to allow the outflow of a pulse of air from reservoir 22 through discharge port 44, upstream connecting line 54, flow control valve 52 and downstream connecting line 56 to discharge head 26. The pulse of air flows to discharge head 26, namely sparge well 58, located in portion 64 of subsoil region 50 and exits from perforations 60, of well 58 at a level below the height of the local water table "W" for sparging. This encourages the removal of contaminants by biodegradation, volatilization or precipitation of chemicals by oxidation.

In a further alternative variation on the apparatus of FIG. 1, in the case of low lying ground, such as in a marsh or a bog, the height of the water table, W, may be coincident with the surface of the soil, or may fluctuate above and below the soil level depending on rain, or drought conditions. Alternatively, it may be desired to release pulses of gas into a liquid medium, such as a contaminated pond, or into a slurry, mud, or a muddy, sandy, or other type of pond bottom. A submersible discharge head can be used for this purpose, subject to the pressures in the system being sufficient to displace the head of water at the depth of the discharge head. In a pond the discharge head will act as a bubbling device.

Figure 2:
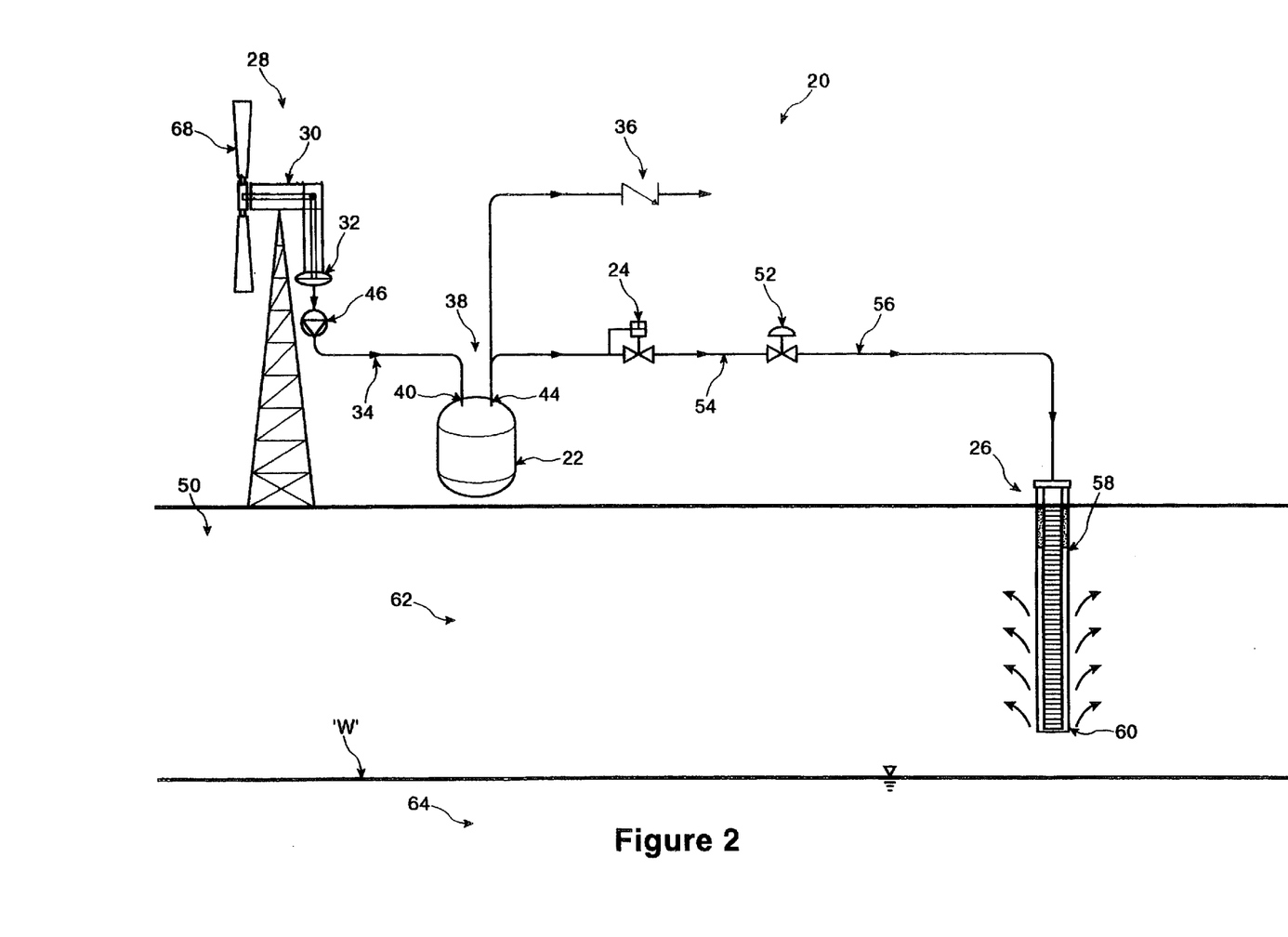
FIG. 2 shows an example of a venting system according to the present invention.

In an alternative embodiment shown in FIG. 2, discharge head 26 is located to discharge into portion 62 of subsoil 50 at a level above, or at least partially above (not shown), the height of the local water table "W" for venting. Perforations 60 lie at a level above the water table 62. The gas is allowed to flow out into the adjacent porous medium that is, the subsoil. The use of this alternative embodiment with the method described above encourages the removal of contaminants by biodegradation and volatilization. Such flow of air continues out into the environment until pressure in reservoir 22 falls below low or reset pressure, at which point discharge valve 24 closes and windmill driven pump 32 begins the cycle of recharging the reservoir 22 anew until reset pressure is reached and the cycle repeats itself once again.

Figure 3:
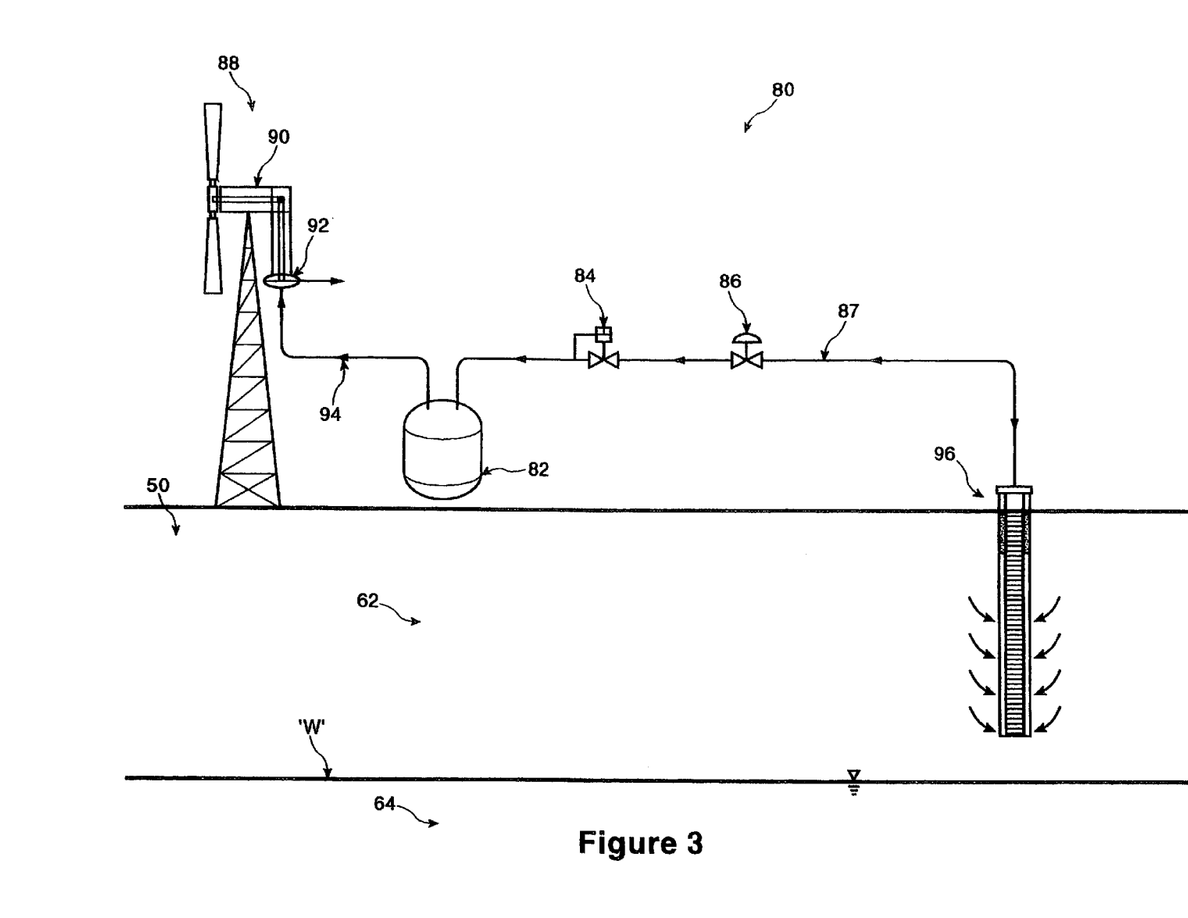
FIG. 3 shows an alternative, vacuum system embodiment similar to the example of FIG. 1.

In a further alternative embodiment, FIG. 3 shows a schematic of an example of an apparatus for wind vapour extraction indicated generally as 80. The apparatus has a vacuum chamber in the nature of a reservoir 82, and a governor in the nature of an 'On'-'Off' control valve 84. A passive vacuum system 88 includes a windmill 90 and a pump 92, driven by windmill 90. Pump 92 is connected to the reservoir 82 by a connecting line 94, in the nature of a pipe or vacuum hose. A check valve in line 94 (not shown) prevents reverse flow when windmill 90 is not operating. The vacuum inlet of pump 92 is connected to reservoir 82 and air is drawn out until the vacuum in reservoir 82 has reached the preset vacuum trigger pressure of valve 84. Valve 84 opens and air is drawn into the reservoir 82 from the inlet head 96. A pressure regulator 86 is located upstream of valve 84. It seeks to maintain a constant vacuum at inlet head 96 by sensing pressure in upstream line 87 and incrementally opening and closing to maintain that pressure at a substantially constant value. Inlet head 96 is a porous pipe located at least partially above the water table and below ground surface. The air drawn into the inlet head 96 will tend to carry with it, and hence remove, volatile contaminants from the subsurface and may also encourage migration of fresh air down from the soil surface to provide oxygen for bioremediation. The flow continues until the vacuum in reservoir 82 reaches a preset minimum, that is, a reset value at which valve 84 will close. Windmill 90 will then evacuate reservoir 82 again.

As in the embodiment of FIG. 1, windmill 90 has a set of blades that rotate about an axis. The axis extends horizontally, and, typically, windmill 90 is mounted with a weather vane arrangement to cause the axis to align with the direction of the wind. Pump 92 is a positive displacement, reciprocating pump with a piston that reciprocates inside a cylinder (whether single acting or double acting). Windmill 90 is linked to pump 92 by a mechanical linkage, in the nature of a crank and a connecting rod for driving the reciprocating piston. A gear, chain, or belt system could also be used. Windmill 90 has a potential wind energy catchment cross section, typically, in the range of 6 to 12 feet in diameter. The flow caused by pump 90 is typically carried in a 2 to 3 inch diameter pipe (5 to 7.5 cm). The dynamic head of the windmill apparatus is commonly in the range of ½ inch of water (125 Pa) or less. The differential pressure, or head, developed by the pump in bioventing is typically one to two (and possibly three) orders of magnitude greater, ranging from a few, or several, inches of water to a few, or several p.s.i. (30 p.s.i.g. being the trigger pressure (200 kPa) in reservoir 22 of FIG. 1, for example). The linkage, whether a crank or gear system, provides a pressure magnification, or augmentation, suitable for permitting the low pressure, high volumetric flowrate of the windmill to produce a much higher pressure, lower volumetric venting flowrate.

It is possible for reservoir 82 to be filled with a filtering, or catalytic material for treating the air drawn out of the ground as it is being passed through the reservoir 82. It is also possible for a filter to be placed to treat the effluent from the positive displacement pump 92 (not shown). The material can be chosen from activated carbon which will adsorb the contamination or a biofilter, a biologically active material that will degrade the contaminant.

In the case of bioventing, the discharge head does not face the hydrostatic pressure that it would face in sparging (that is, releasing air into the subsoil below water table 'W').

In those circumstances, although it is preferred to use an accumulator, or charging tank such as reservoir 22, the back pressure in the subsoil above water level 'W' can be sufficiently low to permit venting, such as vacuum extraction, to proceed without the need for an accumulator.

Figure 4:
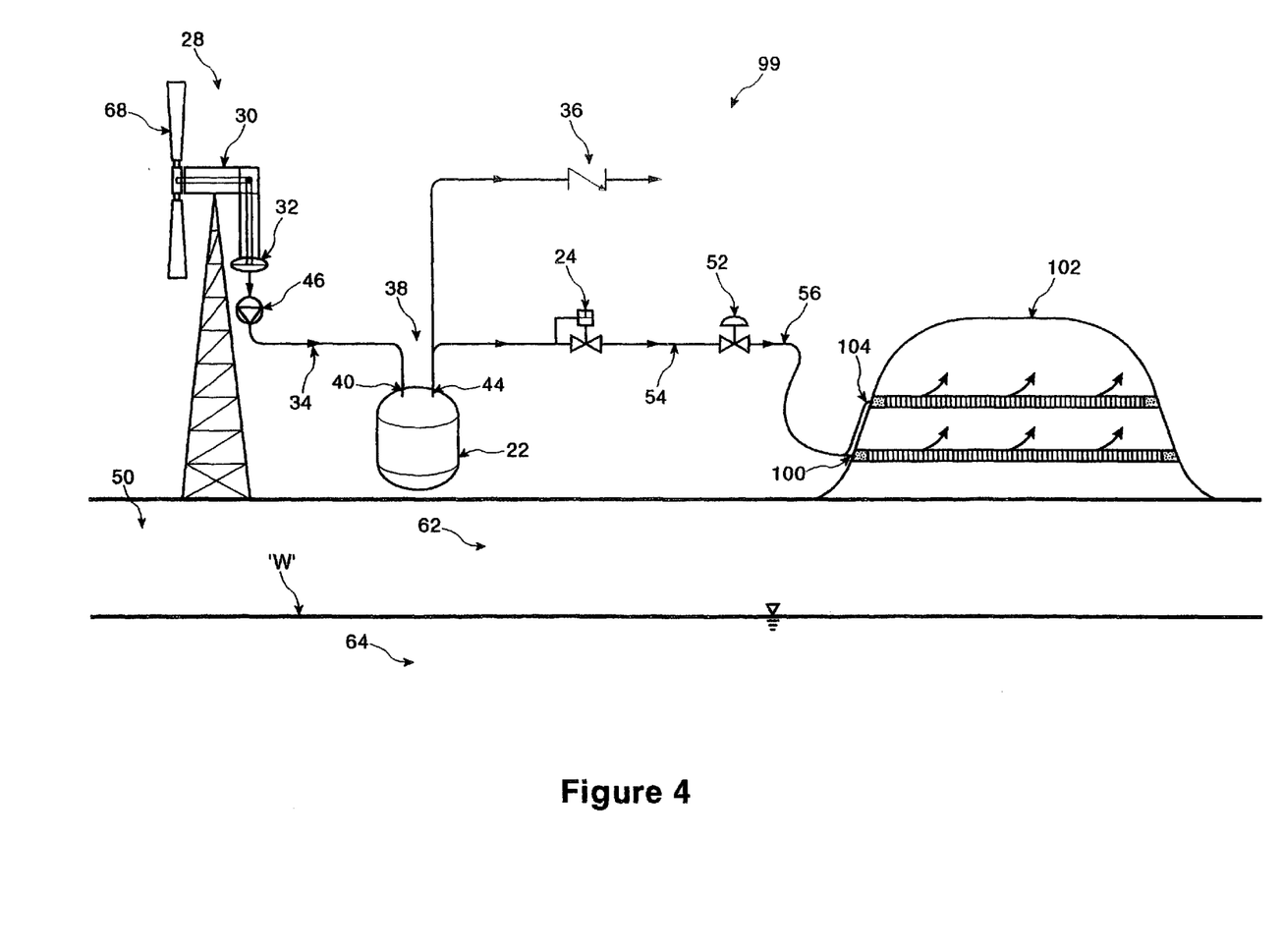
FIG. 4 shows an example of a further alternative to the example of FIG. 2 in which the venting system of FIG. 2 is used to bioremediate a heap pile of material.

In a still further alternative embodiment, FIG. 4 shows a wind biopile assembly indicated generally as 99. When the wind is blowing, windmill 30 drives air pump 32 as shown in the embodiment of FIG. 1, described above. The alternative embodiment of FIG. 4 differs from that of FIG. 1, and from bioventing as shown in FIG. 2, in that a matrix of vented piping 100, has been located in the midst of a pile of biomass 102 ("the biopile") in a manner similar to the placement of drainage tile in a field. The biomass is typically contaminated soil that has been excavated from the ground and formed into a pile. The pile may have several layers, and, as the pile rises, more vented piping 104, can be added. Although two layers are shown, more layers could be added. The piping is spaced at suitable intervals for achieving satisfactory air flow throughout the biopile. A liquid drain (not shown), can also be used to collect liquid run-off that may collect at the bottom of the biopile, and the biopile may be formed above an impermeable containment layer, or containment dam or vessel. An impermeable containment layer (not shown) can also be placed over top of the biopile to protect the biopile from rain, erosion or drying out under hot temperatures.

Alternatively, it is possible for the wind vapour extraction apparatus of FIG. 3, described above, to be combined with the biomass 102 and porous piping 100 and 104 of FIG. 4. This alternative embodiment (not shown) differs from that of FIG. 3 in that inlet head is a porous pipe or pipes located in the midst of pile of contaminated biomass 102. The air drawn into the inlet head will tend to carry with it and hence remove, volatile contaminants from the biopile and may also encourage the migration of fresh air into the biopile to provide oxygen for bioremediation. The flow continues until the vacuum in the reservoir reaches a preset minimum, that is, a reset value, at which point a flow control valve will close. The windmill will then evacuate reservoir and the cycle will repeat itself again. In some instances, it may be desirable for the reservoir to be filled with a filtering, or catalytic material for treating the air drawn out of the biopile as it is being passed through the reservoir. As noted above, the material can be chosen from activated carbon which will adsorb the contamination or a biofilter, a biologically active material that will degrade the contaminant.

Figure 5:
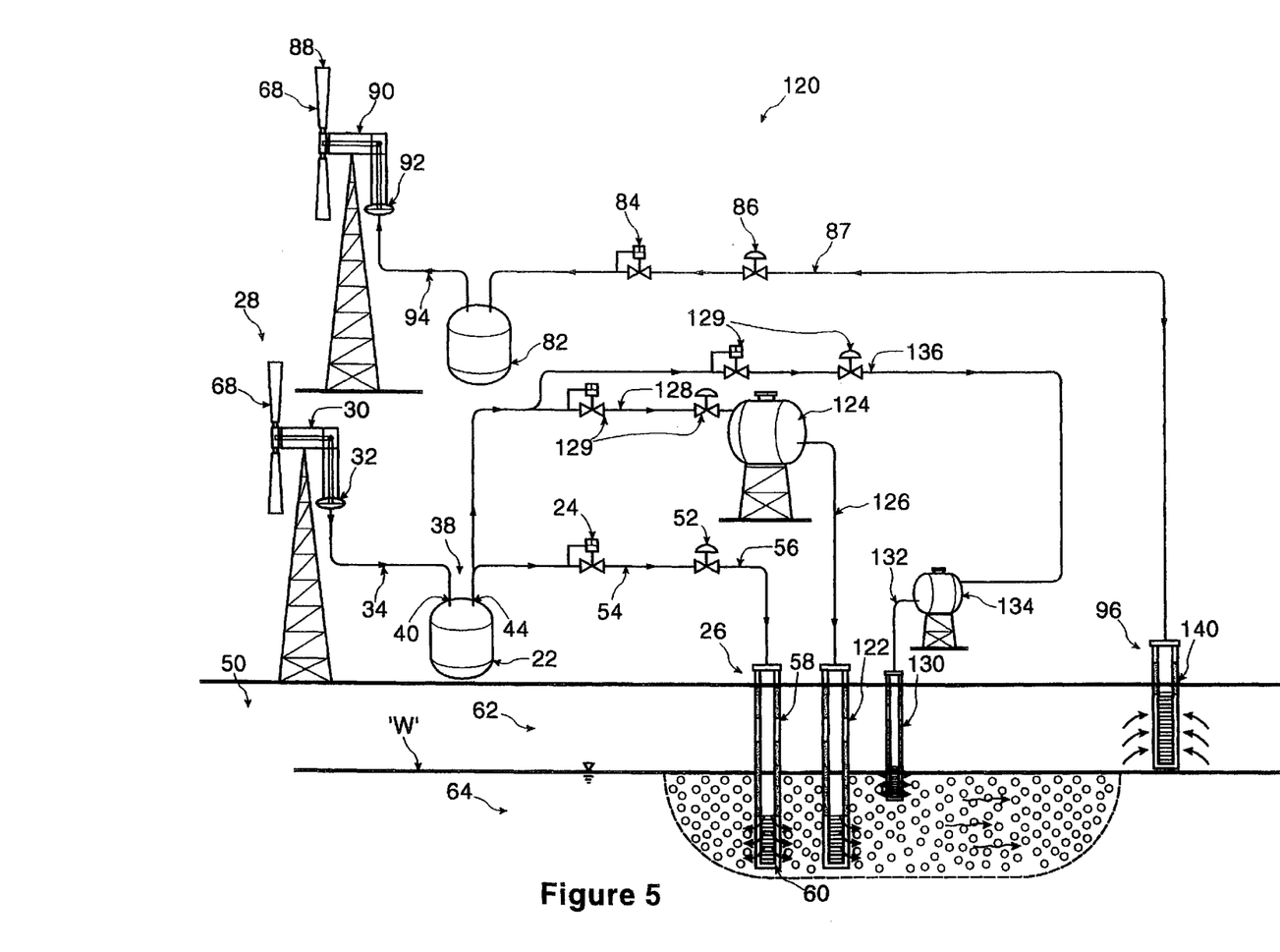
FIG. 5 shows an example of a sparging system combining the examples of FIGS. 1 and 3 and shows additive introduction systems.

In some circumstances it may be desired to introduce a chemical additive, such as an oxidant or a reducing agent, to facilitate transformation or removal of a known contaminant. Alternatively, in a biological process, it may be desirable to introduce nutrients, such as nitrate phosphate, to increase the rate of biological break-down of the contaminant, or contaminants by microorganisms. The schematic illustration of FIG. 5 shows a combination of remediation elements. A remediation system is indicated generally as 120. Elements corresponding to the elements of FIG. 1 have the same item numbers as previously indicated. Although remediation system 120 has appropriate check valves and pressure relief valves, all check valves 46 and pressure relief valves 36 have been omitted from FIG. 5 for clarity.

Adjacent to well 58 is a chemical addition well 122. Chemical is fed to well 122 from a chemical addition tank 124 mounted above ground. The flow rate of additive in a liquid form between tank 124 and well 122 down feedline 126 is controlled by suitable valving (not shown). The additive may be gravity fed, or may, optionally, be assisted by bleeding pressurized air from reservoir 22 of passive gas recharging system 28 through a bleedline 128 having suitable flow and pressure control elements 129. Well 122 is ported to permit the additive to be introduced to, and to diffuse into, the subsoil, whether below the level of water table 'W' as shown, or above it, as may be chosen for the specific contaminant and soil conditions. The additive can then react with the contaminant and the gas from well 58 to achieve a desired remedial effect. The additive need not be provided in liquid form, but could, if soluble in water, be introduced into a well below the water table. Once dissolved, the additive can be carried diffusely into subsoil portion 64 and 62.

Alternatively, or possibly additionally, a third well 130 is shown for introducing either remediation microbes, or nutrients for remediation microbes to encourage or enhance biological activity in the subsoil. As above, the nutrients can be introduced down an appropriately valved feedline 132 from a supply tank 134. As above, this feed can be a gravity fed or can be enhanced by bleeding pressure from reservoir 22 of passive gas recharging system 28 through bleedline 136 having suitable flow and pressure control elements 129.

Adjacent to well 130 is a further well 140 similar to the vapour extraction well and associated assembly elements shown in FIG. 3. Well 58 and well 140, working in combination, combine to yield a diffuse flow in the subsoil between the 'source' of well 58 and the 'sink' of well 140. This may tend to enhance the effectiveness of bioremediation and encourages the volatile contaminants removed from the groundwater by the gas from sparge well 58 to collect in removal well 140 rather than be released to the above ground environment.

Figure 6:
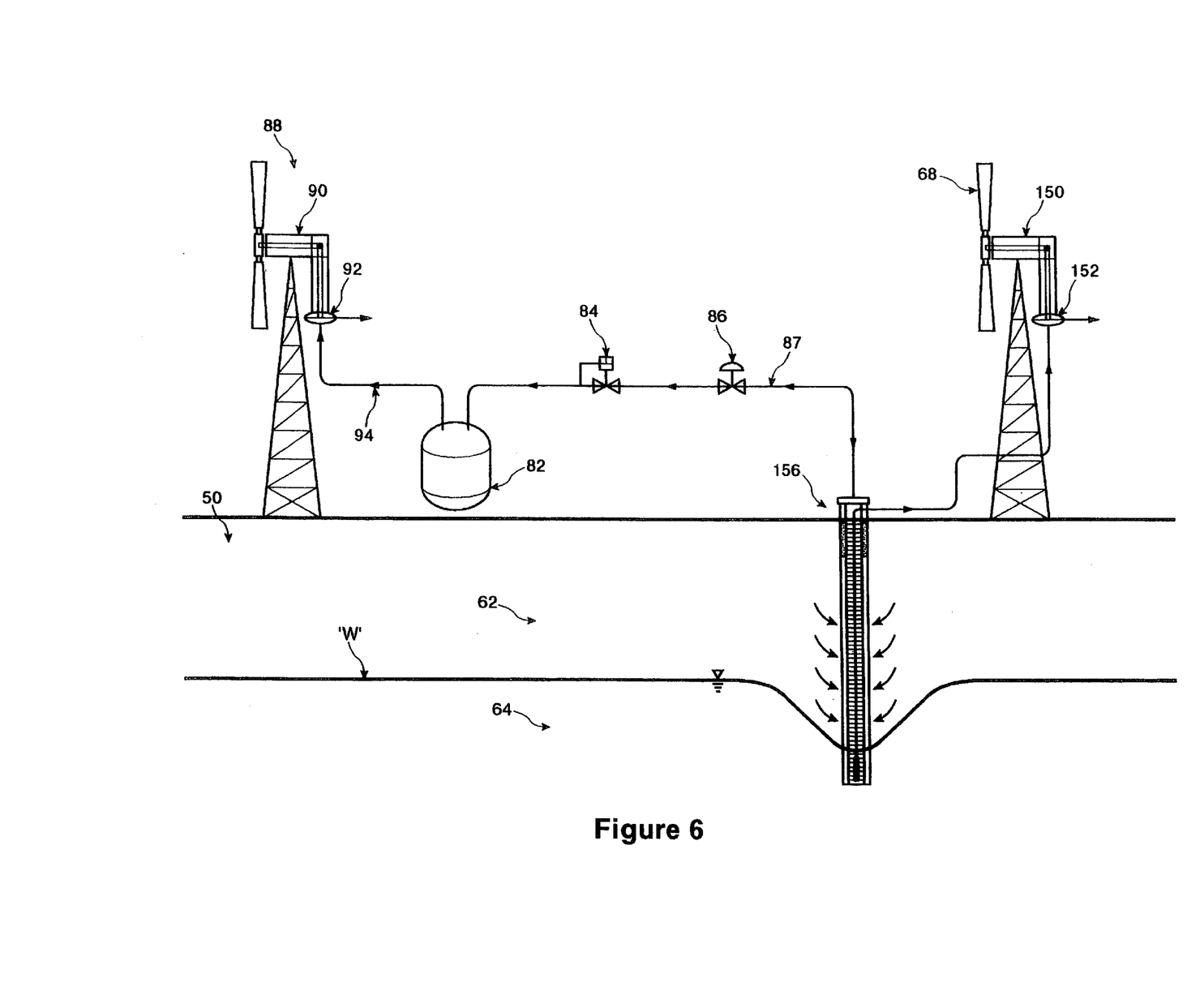
FIG. 6 shows an example of a dual phase extraction process according to the present invention.

In the alternative, two phase extraction embodiment of FIG. 6, the vapour phase extraction elements of FIG. 3 are combined with liquid phase extraction elements in the nature of a windmill 150 and a windmill driven liquid pump 152, with for example, as shown, a submersible pump head 156. Pump 152 can then be used to extract groundwater thereby tending to lower the water table and to expose more contaminated soil to the air flow provided by the vapour phase extraction elements of FIG. 3. The vapour phase extraction elements of FIG. 3 draw air out of the soil that was once below the water table and allow for the removal of contaminated vapour and the flow of air from above the ground to encourage bioremediation. The contaminated vapours can be treated in the combined pulse and treatment reservoir 82.

Alternatively, a single windmill can be used with appropriate mechanical linkages to drive both air pump 92 for drawing gas from the reservoir so as to establish a partial vacuum and liquid pump 152 for removing accumulated liquids that may collect in the bottom of the well. The linkages may be arranged to drive both air pump 92 and liquid pump 152 at the same time. Alternatively given the long duty cycle envisioned for these devices, a single windmill, such as windmill 90 can be used first to drive one of (a) the air pump and (b) the liquid pump; and then to drive the other. Such a system could be activated by a liquid level sensor in the well to cause the liquid pump to be operated once a certain amount of liquid had accumulated, and to cease pumping when the fluid level in the well drops to some other sensed level.

The alternative of FIG. 6 can be used in conjunction with sparging well 58, as shown in FIG. 5, and either or both of the chemical additive feed and the microbial food feed systems previously described. Although only a single pulsed sparging well, being well 58, is shown, and although only a single extraction well, being well 140, or, alternatively, a single two phase extraction well, such as well 156 is shown, it is possible to have an array, or string of sparging or venting wells arrayed on one side of a contaminated area, and a corresponding array, or string of either single or two phase extraction wells arrayed along an opposite side, with optional chemical additive or microbial feeds. It will be appreciated that such an array need not be rectangular, but could involve a single input or output well surrounded by a ring of corresponding output or input wells. Further, in such an array, a single windmill and pump may be used to supply pressure, or draw a partial vacuum, at a single well, or at several wells, given suitable valves, manifolds and other commonly available hardware.

In an alternative method, contaminated soil and groundwater, which may typically contain volatile and semi-volatile organic compounds such as oil, gasoline, diesel fuel, chlorinated solvents, related contaminants and metals such as iron, undergo remediation through soil vapour extraction as described in FIG. 3 and dual phase extraction as described in FIG. 6. In an alternative method used in conjunction with the apparatus of FIG. 3, a windmill driven vacuum system 88 develops a partial vacuum in reservoir 82. When the vacuum trigger pressure of valve 84 is reached, valve 84 opens, at least partially relieving the vacuum in reservoir 82. The air drawn into porous inlet head 96 will tend to carry with it, and hence remove, volatile contaminants in the subsoil. The flow continues until the pressure in reservoir 82 rises to reach a reset value at which valve 84 will close. Windmill 90 will then once more draw down the pressure in reservoir 82 to permit the process to repeat. In an alternative method, reservoir 82 can be filled with a filter or catalytic material to treat the air drawn out of the ground as it is being passed through the reservoir 82. Alternatively, a filter may be placed so as to treat the effluent drawn from the positive displacement pump 92.

In an alternative method that can be used with the apparatus of FIG. 6, the method of soil vapour extraction can be combined with a method of liquid phase extraction in which windmill driven liquid pump 152 is used to extract groundwater, for example, through submersible pump head 156 as shown, thereby lowering the water table and exposing more contaminated soil to the vapour phase extraction elements. The extracted groundwater can also be treated to remove contaminants.

In an alternative method it may be desirable to add a chemical additive such as an oxidant or a reducing agent to the subsoil. It may also be desirable to add nutrients and, or remediation microbes to the subsoil to facilitate the transformation or removal of a contaminant or contaminants in soil and groundwater. As above, chemical additives, nutrients and, or remediation microbes can be gravity fed down appropriately valved feedlines 126 and 132 from supply tanks 124 and 134 respectively, or may optionally be assisted by bleeding pressurized air from reservoir 22 through bleedlines 128 and 136.

In an alternative method used in conjunction with the apparatus of FIG. 4, contaminated soil, which may typically contain volatile and semi-volatile organic contaminants undergoes remediation through engineered biomass or biopiles. A windmill 30 drives air pump 32 and directs air through connecting line 34 into reservoir 22 via inlet port 40. Air is accumulated in reservoir 22 until the trigger pressure is reached. Once the trigger pressure is reached, discharge valve 24 opens to allow the outflow of a pulse of air from reservoir 22 through discharge port 44, upstream connecting line 54, flow control valve 52 and downstream connecting line 56 to vented piping 100 and 104 thereby encouraging the remediation of contaminated soil through biodegradation and volatilization.

A preferred embodiment has been described in detail and a number of alternatives have been considered. As changes in or additions to the above described embodiments may be made without departing from the nature, spirit or scope of the invention, the invention is not to be limited by or to those details, but only by the appended claims.

We claim:

1. A bioventing apparatus, comprising:
    a windmill, an air pump, and a linkage between the windmill and the pump to permit the windmill to drive the pump at a higher differential pressure than the dynamic pressure of the wind;
    a venting head connected in fluid communication with the pump, said venting head being for placement to interact with a porous medium to be vented at a level above the water table.

2. The venting apparatus of claim 1 wherein said venting head is a vacuum extraction head and said pump is operable to draw gases into said venting head.

3. The venting apparatus of claim 1 wherein said pump is connected to force air to exit from said venting head.

4. The venting apparatus of claim 1 wherein said pump is a positive displacement pump.

5. The venting apparatus of claim 1 wherein said pump is a reciprocating pump.

6. An apparatus for establishing and relieving a partial vacuum, comprising:

a reservoir in which to establish the partial vacuum, said reservoir having porting to permit gas to exit and enter said reservoir;

an inlet head connected to said reservoir, said inlet head being located to draw gas from a porous medium;

an inlet governor mounted to control the entry of gas into said reservoir; and a passive gas recharging system connected to said reservoir to permit reestablishment of said partial vacuum.

7. The apparatus of claim 6 wherein said governor is operable to release pulses of gas into the reservoir.

8. The apparatus of claim 6 wherein said governor has a sensing member connected to monitor the gas in said reservoir.

9. The apparatus of claim 8 wherein said governor is a pressure regulated valve, said valve being operable to open when the partial vacuum in said reservoir is at a low value and to close when the pressure of the partial vacuum in said reservoir rises above a higher value.

10. The apparatus of claim 6 wherein said passive gas recharging system includes a pump for drawing down the pressure in said reservoir.

11. The apparatus of claim 10 wherein said pump in the passive gas recharging system is driven by energy available from the set chosen from the following:

(a) solar energy;
    (b) hydraulic energy;
    (c) wind energy;
    (d) geothermal energy; and
    (e) wave energy.

12. The apparatus of claim 10 wherein said pump is driven by a windmill.

13. The apparatus of claim 12 wherein said pump is a positive displacement pump.

14. A method of drawing a gas from a porous medium, comprising the steps of (a) developing a partial vacuum in a reservoir;
    (b) establishing fluid communication between the reservoir and a well head located in the porous medium;
    (c) drawing gas from the porous medium to at least partially relieve the vacuum; and
    (d) reestablishing the partial vacuum in the reservoir using a passive recharging system.

15. The method of claim 14 wherein said method includes the steps of (a)(i) monitoring the vacuum in the reservoir;
    (b)(i) permitting the step of drawing to occur once a set level of vacuum has been observed in the reservoir;
    (c)(i) allowing the pressure in reservoir to rise to a higher value;
    (d)(ii) impeding further increase in pressure in the reservoir once the pressure has risen to the higher value.

16. The method of claim 15 wherein said step of permitting includes regulating the flow of the gas from the porous medium with a regulator to encourage at least a portion of the drawing to occur at a constant draw rate.

17. The method of claim 14 wherein said step of using a passive gas recharging system includes (d)(i) using a pump to establish the partial vacuum in the reservoir; and
    (d)(ii) using a windmill to drive the pump.

18. The method of claim 14 wherein said step of drawing includes drawing said gas from the ground at a level above the height of the local water table.

19. The method of claim 14 wherein said method includes the steps of locating the well head at least partially below the water table;
    permitting liquid to enter the well head; and
    extracting liquid from the well head.

20. The method of claim 14 wherein said gas drawn from the porous medium is treated in the reservoir or a filtration bed.

21. The method of claim 20 wherein the gas is a volatile organic compound.

22. An apparatus for soil and groundwater remediation comprising:

at least one windmill;
    an air pump driven by said at least one windmill;
    a reservoir connected to said air pump for drawing gas from reservoir to establish a partial vacuum;
    an inlet governor on said reservoir which blocks the entry of gas into said reservoir until the partial vacuum reaches a preset minimum pressure;
    which opens and then permits the entry of gas into said reservoir until the partial vacuum rises to preset maximum pressure, and closes at the maximum pressure;
    an extraction well in the ground;
    said inlet governor being connected to said well to permit gas to be extracted from the well; and
    a liquid pump driven by said at least one windmill;
    said liquid pump being connected to said well for drawing liquid therefrom.

23. The apparatus of claim 22 wherein a single windmill is connected to drive both said air pump and said liquid pump.

24. The apparatus of claim 23 wherein said single windmill is connected to drive one of said air pump and said liquid pump and then to drive the other.

25. The apparatus of claim 22 wherein one windmill is connected to drive said air pump and another windmill is connected to drive said liquid pump.

* * * * *